(12) United States Patent
Rashidi et al.

(10) Patent No.: US 9,446,951 B2
(45) Date of Patent: Sep. 20, 2016

(54) HIGHLY-ORDERED NANOSTRUCTURE ARRAYS AND METHODS OF PREPARATION THEREOF

(76) Inventors: Alimorad Rashidi, Tehran (IR);
Kheirollah Jafari Jozani, Karaj (IR);
Mahnaz Pourkhalil, Tehran (IR);
Mahdi Mohajeri, Tehran (IR); Hamzeh Ghorbani, Tehran (IR); Maryam Rashtchi, Tehran (IR)

( * ) Notice: Subject to any disclaimer, the term of this patent is extended or adjusted under 35 U.S.C. 154(b) by 1190 days.

(21) Appl. No.: 13/450,518

(22) Filed: Apr. 19, 2012

(65) Prior Publication Data
US 2012/0204890 A1    Aug. 16, 2012

(51) Int. Cl.
| | | |
|---|---|---|
| D01F 9/127 | (2006.01) |
| A24D 3/16 | (2006.01) |
| C25D 7/06 | (2006.01) |
| B82Y 30/00 | (2011.01) |
| B82Y 40/00 | (2011.01) |
| A24B 15/28 | (2006.01) |
| C25D 11/08 | (2006.01) |
| C25D 11/24 | (2006.01) |
| C25D 11/26 | (2006.01) |

(52) U.S. Cl.
CPC .............. *B82Y 30/00* (2013.01); *A24B 15/286* (2013.01); *A24D 3/16* (2013.01); *B82Y 40/00* (2013.01); *C25D 11/08* (2013.01); *C25D 11/24* (2013.01); *C25D 11/26* (2013.01)

(58) Field of Classification Search
CPC ........ C25D 11/08; C25D 11/24; C25D 11/26; B82Y 40/00; B82Y 30/00; A24D 3/16; A24B 15/286
USPC ........ 423/447.1–447.3, 445 B; 977/742–754, 977/842–848
See application file for complete search history.

(56) References Cited

U.S. PATENT DOCUMENTS

| | | | | |
|---|---|---|---|---|
| 6,121,685 A * | 9/2000 | Gardner | ............ | H01L 23/53233 257/751 |
| 6,129,901 A * | 10/2000 | Moskovits | ............. | B82Y 10/00 423/439 |
| 2004/0131811 A1* | 7/2004 | Lee | ........................ | B01J 19/088 428/36.9 |
| 2005/0287064 A1* | 12/2005 | Mayne | .................... | B82Y 30/00 423/445 B |

* cited by examiner

*Primary Examiner* — Daniel C McCracken

(57) ABSTRACT

Highly-ordered nanostructure arrays and methods of preparation of the highly-ordered nanostructure arrays for adsorption of pollutants are disclosed. The highly-ordered nanostructure arrays can be vertically aligned metal oxide nanotube arrays having metal-deposited carbon nanotubes within the nanostructures. The metal-deposited carbon nanotubes within the nanostructures increase the adsorption of the pollutants, as discussed in greater detail below. The highly-ordered nanostructure arrays can be included in various filters, such as cigarette filters, to adsorb carcinogens and pollutants from the tobacco smoke.

20 Claims, 4 Drawing Sheets

HIGHLY-ORDERED NANOSTRUCTURE ARRAYS AND METHODS OF PREPARATION THEREOF

SPONSORSHIP STATEMENT

This application has been financially sponsored for international filing by the Iranian Nanotechnology Initiative Council and Carbon Nanotechnology and Energy Corporation (Iran).

TECHNICAL FIELD

This application generally relates to nanostructures for the adsorption of pollutants, and more particularly relates to highly-ordered nanostructure arrays and methods of preparation of the highly-ordered nanostructure arrays for the adsorption of pollutants.

BACKGROUND

Air pollution from, for example, exhaust gases and cigarette smoke have a harmful effect on the environment and human health. For example, cigarette smoke can lead to heart and lung diseases, such as stroke, chronic obstructive pulmonary disease, emphysema, and lung cancer for both smokers and non-smokers who breathe in the secondhand smoke. In particular, cigarette smoke contains over 4,000 chemical compounds, which can bind with DNA to either kill human cells or cause genetic mutations in the DNA leading to cancer. Cigarette smoke includes many common carcinogens, such as polynuclear aromatic hydrocarbons produced by the pyrolysis of tar, acroleins, nitrosamines, nicotine, and ammonia, as well as large amounts of nitric oxide ($NO_x$) and sulfur oxide ($SO_x$).

Various methods for filtering exhaust gases and cigarette smoke have previously been disclosed. For example, micron-sized ceramic powders, such as aluminum titanate ($Al_2TiO_5$), mullite ($3Al_2O_3$-$2SiO_2$), spodumene ($LiAl(SiO_3)_2$), eucryptite ($LiAlSiO_4$), potassium titanate ($K_2Ti_6O_{13}$), silica ($SiO_2$), alumina ($Al_2O_3$), and clay mineral have been disclosed for removing soot from exhaust gases. In another example, activated carbon and graphite, both in granular and ball-shaped morphologies, have been disclosed to remove soot. In yet another example, heated porous ceramic membranes, such as porous zirconia ("zirconium dioxide"; $ZrO_2$), alumina ("aluminium oxide"; $Al_2O_3$), silicon nitride ($Si_3N_4$), and/or a combination thereof, have been used to remove carbon particles. In addition, photocatalysts including titanium oxide ($TiO_x$), zinc oxide ($ZnO_x$), and iron oxide ($FeO_x$), supported by activated carbon fiber have been used in air filters.

More recently, carbon nanotubes have been suggested for removing dust and adsorbing chemical vapors, such as ammonia ($NH_3$), hydrofluoric acid (HF), hydrochloric acid (HCl), and organic gases. In addition, zeolites have been used for nitric oxide reduction.

However, previous filtering methods are relatively expensive and require frequent filter replacement. As such, a new, more efficient and economical filtering method for removing harmful airborne compounds is needed.

SUMMARY

Highly-ordered nanostructure arrays and methods of preparation of highly-ordered nanostructure arrays are disclosed. Initially, a metal foil is received and the metal foil is then anodized to form a highly-ordered metal oxide nanostructure array. Next, carbon nanotubes are synthesized within the inner walls of the highly-ordered metal oxide nanostructures to form a highly-ordered carbon and metal oxide nanostructure array. Next, catalytic metal particles are deposited on the surface of the carbon nanotubes to form a highly-ordered metal-deposited carbon and metal oxide nanostructure array. Finally, the highly-ordered metal-deposited carbon and metal oxide nanostructure array is included in a filter for adsorbing pollutants.

In some implementations, the metal foil includes a single metal that can be titanium. In some implementations, the metal foil is a metal alloy foil including two or more metals that can be titanium, aluminum, and vanadium.

In some implementations, the highly-ordered metal oxide nanostructure array can be a vertically oriented highly-ordered metal oxide nanotube array. In some implementations, the metal foil can be anodized to form the highly-ordered metal oxide nanostructure array by using the metal foil as an anode, using another metal foil that is different from the metal foil as a cathode, and using an electrolyte including fluoride ions mixed with an organic solution in an electrochemical cell to form the highly-ordered metal oxide nanostructure array.

In some implementations, the carbon nanotubes can be synthesized within the inner walls of the highly-ordered metal oxide nanostructures to form the highly-ordered carbon and metal oxide nanostructure array by synthesizing carbon nanotubes within the inner walls of the highly-ordered metal oxide nanostructures by chemical vapor deposition using a carbon source. The carbon source can be a gaseous carbon source or a liquid carbon source.

In some implementations, the catalytic metal particles can be catalytic inner transition metal particles or catalytic metal oxide particles. In some implementations, the filter can be a cigarette filter and the pollutants can be at least nitric oxide and sulfur oxide.

A pollutant filter for adsorbing pollutants including a vertically aligned, highly-ordered metal-deposited carbon and metal oxide nanostructure array is also disclosed. The vertically aligned, highly-ordered metal-deposited carbon and metal oxide nanostructure array includes a vertically aligned, highly-ordered metal oxide nanotube array, carbon nanotubes synthesized within the inner walls of the vertically aligned, highly-ordered metal oxide nanotube array, and catalytic metal nanoparticles deposited on the surface of the carbon nanotubes synthesized within the inner walls of the vertically aligned, highly-ordered metal oxide nanotube array. The catalytic metal nanoparticles have a diameter of less than 100 nanometers.

In some implementations, the catalytic metal particles can be catalytic inner transition metal particles or catalytic metal oxide particles. In some implementations, the pollutant filter can be a cigarette filter and the pollutants can be at least nitric oxide and sulfur oxide.

Details of one or more implementations and/or embodiments of the highly-ordered nanostructure arrays and methods of preparation of the highly-ordered nanostructure arrays are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

Highly-ordered nanostructure arrays and methods of preparation of the highly-ordered nanostructure arrays for adsorption of pollutants are disclosed. The highly-ordered nanostructure arrays can be vertically aligned metal oxide nanotube arrays having metal-deposited carbon nanotubes within the nanostructures. The metal-deposited carbon nanotubes within the nanostructures increase the adsorption of the pollutants, as discussed in greater detail below. The highly-ordered nanostructure arrays can be included in various filters, such as cigarette filters, to adsorb carcinogens and pollutants from the tobacco smoke.

Figure 1:
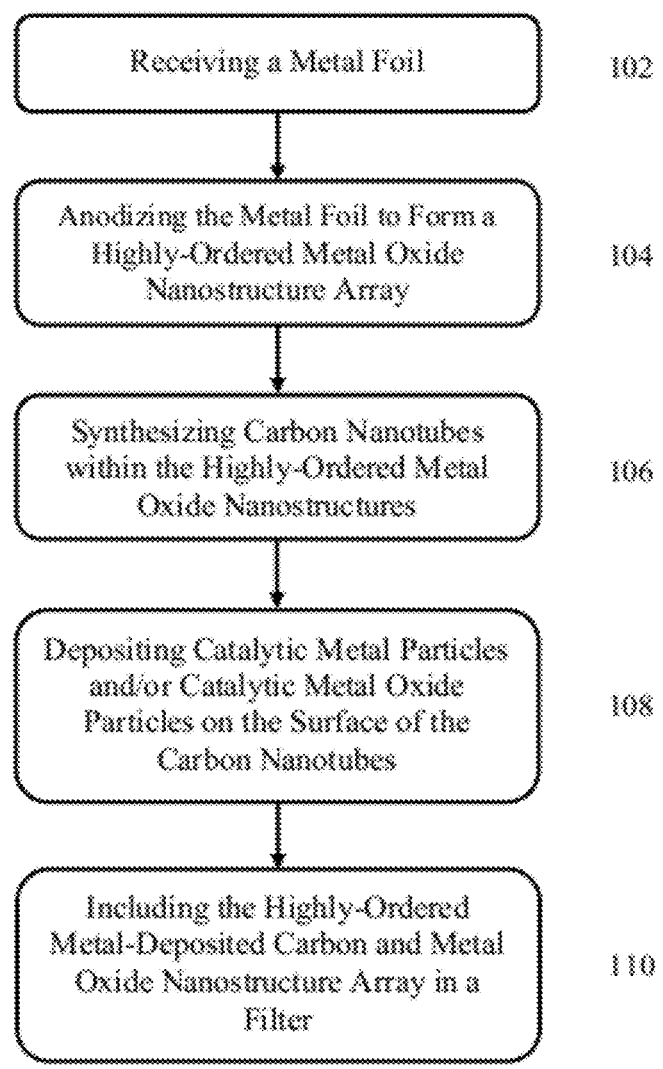
FIG. 1 illustrates an example of a method for preparing the highly-ordered nanostructure arrays.

Referring to FIG. 1, a method of preparation of the highly-ordered nanostructure arrays is disclosed. Initially, a metal foil is received (step 102). In some implementations, reception of the metal foil can be reception of a prepared metal foil from another source whereas, in other implementations, the metal foil can be prepared as part of preparation of the highly-ordered nanostructure arrays.

In some implementations, the metal foil can include a single metal while in other implementations, the metal foil can be a metal alloy foil including multiple metals. One or more metals, such as, for example, titanium (Ti), aluminum (Al), vanadium (V), iron (Fe), copper (Cu), gold (Au), silver (Ag), platinum (Pt), nickel (Ni), silicon (Si), palladium (Pd) and/or any inner transition metal can be included in the metal foil. The metal foil can be a metal sheet having any thickness and, preferably, maximum thickness of the metal foil is 2 millimeters.

In implementations where the metal foil is a metal alloy foil, the alloy can be created by, for example, scattering and diffusing an alloying metal into a foil of a base metal. The alloying metal can be deposited on the surface of a base metal foil by, for example, sol-gel techniques, electrodeposition, electrochemical deposition, chemical vapor deposition, physical vapor deposition, and/or heat treatment. In some implementations, for example, vanadium and aluminum can be diffused into the surface of a titanium foil.

In some implementations, the metal foil can be etched to remove any metal oxides from the surface of the metal foil before anodization. For example, the metal foil can be etched using an etchant including at least one acid. In some implementations, the etchant can be made up of nitric acid ($HNO_3$) and hydrofluoric acid (HF). The ratio of nitric acid to hydrogen fluoride in an etchant can range between 1:5 and 5:1 and, preferably, be 3:1.

Next, the metal foil is anodized to form a highly-ordered metal oxide nanostructure array (step 104). The nanostructure array can be, for example, in the form of nanotubes and/or nanopores. In some implementations, the nanostructure array can be, preferably, vertically oriented. The diameter of the nanostructures can be, preferably, less than 100 nanometers and the height of the nanostructures can be between one micrometer and one millimeter.

The anodization can be performed in a two-electrode configuration, i.e., electrochemical cell, with the metal foil as the anode, another metal foil as the cathode, and an electrolyte. In some implementations, for example, the cathode can be a metal foil made up of a single type of metal, such as copper or platinum, which is different from the anode. The electrolyte can be an organic electrolyte or an inorganic electrolyte. In some implementations, the electrolyte can be an aqueous solution including fluoride ions mixed with an organic solution. For example, the electrolyte can be a solution of distilled water, ethylene glycol ($C_2H_6O_2$), and ammonium fluoride ($NH_4F$). In some implementations, preferably, the anodization can be performed in a cooled environment of about 11° C. However, the anodization can be performed at any temperature between 0° C. and 100° C.

Next, carbon nanotubes are synthesized inside of the highly-ordered metal oxide nanostructures to form highly-ordered carbon and metal oxide nanostructure arrays (step 106). The percentage of the volume occupied by the carbon nanotubes within the metal oxide nanostructures is between 4% and 10%. Initially, impurities can be removed from the highly-ordered metal oxide nanostructures by immersing the highly-ordered metal oxide nanostructures in a solvent, such as, for example, ethanol ($C_2H_6O$), acetone (($CH_3)_2CO$), and/or hexane ($C_6H_{14}$). The highly-ordered metal oxide nanostructures are then dried.

Various methods can be utilized to synthesize the carbon nanotubes along the inner walls of the highly-ordered metal oxide nanostructures. In some implementations, chemical vapor deposition can be used by placing the highly-ordered metal oxide nanostructure array in a heated environment in the presence of a gaseous carbon source so that the carbon is decomposed to form carbon nanotubes within the nanostructures. The gaseous carbon source can be any carbon source, such as, for example, acetylene gas ($C_2H_2$), methane ($CH_4$), and/or carbon monoxide (CO). The temperature of the heated environment depends on the decomposition temperature of the gaseous carbon source and can range from 600° C. to 1,200° C.

In some implementations, the highly-ordered metal oxide nanostructure array can be placed in a heated environment in the presence of a liquid carbon source. For example, the highly-ordered metal oxide nanostructure array can be placed in a holder, such as a crucible, including a liquid carbon source. The liquid carbon source can be, for example, ethylene glycol, polyethylene glycol ("PEG"), ethanol, methanol, and/or propanol. The crucible including the highly-ordered metal oxide nanostructure array and the liquid carbon source can then be placed in a heated environment under an inert nitrogen atmosphere so that carbon nanotubes are formed within the highly-ordered metal oxide nanostructures. The temperature of the heated environment depends on the decomposition temperature of the gaseous carbon source and can range from 600° C. to 1,200° C.

Next, catalytic metal particles and/or catalytic metal oxide particles are deposited on the surface of the carbon nanotubes to form a highly-ordered metal-deposited carbon and metal oxide nanostructure array (step 108). The catalytic metal particles and/or catalytic metal oxide particles can be catalytic inner transition metal particles and/or catalytic inner transition metal oxide particles. The catalytic metal particles and/or catalytic metal oxide particles can, preferably, be nanosized, i.e., less than a 100 nanometers in diameter.

In some implementations, the catalytic metal particles and/or catalytic metal oxide particles can be electrodeposited on the surface of the carbon nanotubes. In other implementations, the carbon nanotubes can be immersed in a solution including metal ions in the presence of heat to deposit catalytic metal particles and/or catalytic metal oxide particles on the surface of the carbon nanotubes.

Finally, the highly-ordered metal-deposited carbon and metal oxide nanostructure array is included in a filter (step 110). The filter can be any filter for adsorbing pollutants, such as, for example, cigarette filters, automobile exhausts, and/or industrial filters. In implementations where the filter is a cigarette filter, the highly-ordered metal-deposited carbon and metal oxide nanostructure array can be mixed with the fibrous material that makes up the cigarette filter or included in a cigarette holder to adsorb harmful carcinogens in the tobacco smoke, such as ammonia ($NH_3$), nitric oxide ($NO_x$), and sulfur oxide ($SO_x$).

In some implementations, the entirety of a cigarette filter can include the highly-ordered carbon and metal oxide nanostructure arrays, while in other implementations, in order to reduce the production costs, only a part, such as the end part, of a cigarette filter can include the highly-ordered metal-deposited carbon and metal oxide nanostructure array.

Example 1

Initially, a metal foil made up of 99.9 wt % titanium is received (step 102). The metal foil is etched in a solution of nitric acid and hydrofluoric acid mixed at a 3:1 ratio for under one minute to remove any metal oxides. The metal foil is used as an anode and a copper foil is used as a cathode in a two-electrode configuration (step 104). The electrolyte solution is ethylene glycol, distilled water, and ammonium fluoride mixed at a ratio of 0.5:2:97.5 and electrolysis is performed at a constant temperature of 11° C. with an applied voltage of 60 volts for about two hours. Vertically aligned titanium oxide nanotube arrays are formed on the metal foil. About 10 mg of the titanium oxide nanotube array is then added to a cigarette filter (step 110).

Example 2

Figure 2:
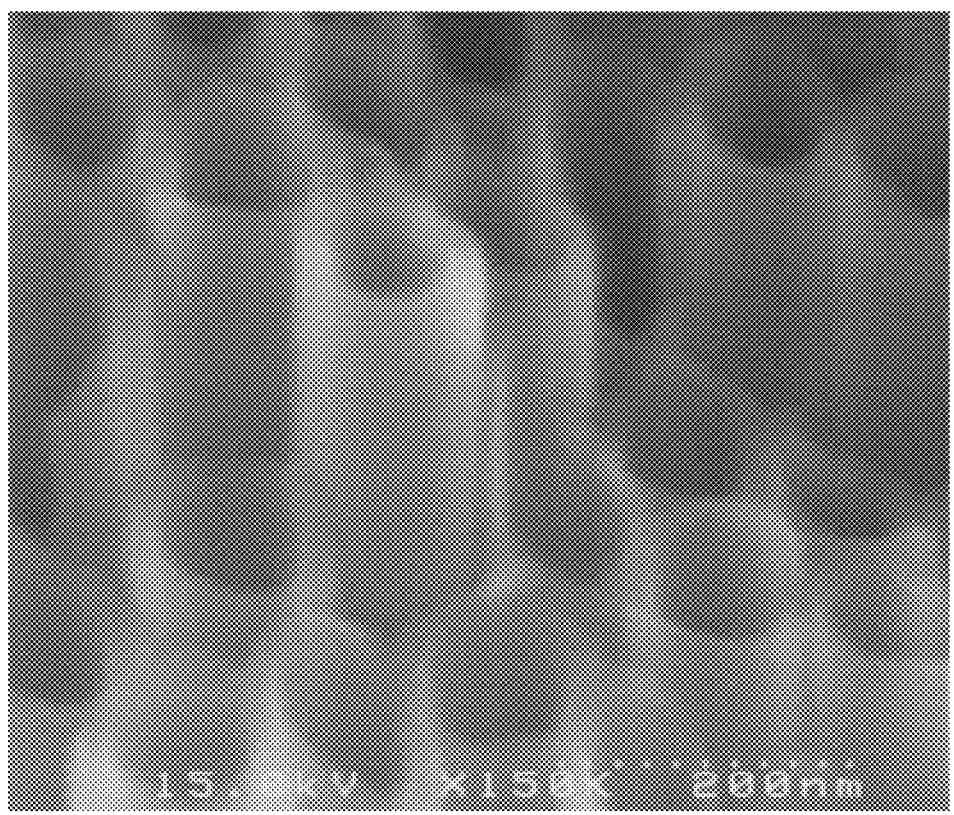
FIG. 2 illustrates a field-emission scanning electron microscopy ("FESEM") image of the top surface of an example titanium oxide nanotube array.
Figure 3:
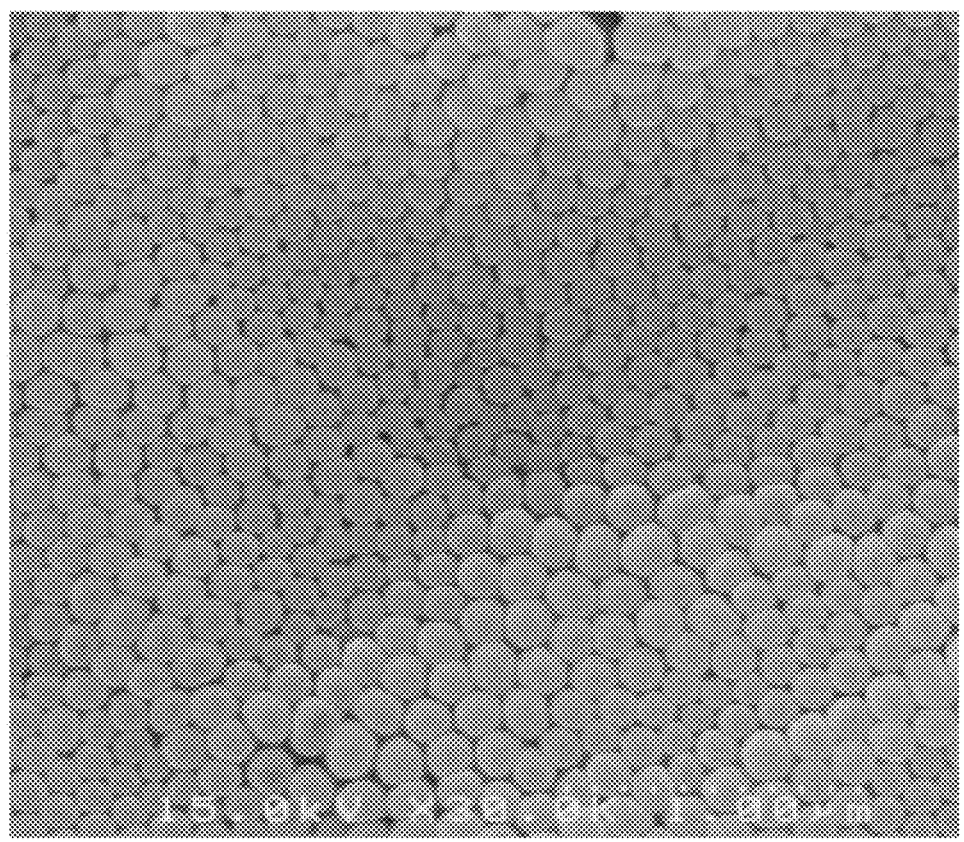
FIG. 3 illustrates an FESEM image of the bottom surface of the example titanium oxide nanotube array.

Initially, a metal alloy foil made up of 99 wt % titanium, 0.5 wt % vanadium, and 0.5 wt % aluminum is received (step 102). The metal alloy foil is etched in a solution of nitric acid and hydrofluoric acid mixed at a 3:1 ratio for under one minute to remove any metal oxides. The metal alloy foil is used as an anode and a copper foil is used as a cathode in a two-electrode configuration (step 104). The electrolyte solution is ethylene glycol, distilled water, and ammonium fluoride mixed at a ratio of 0.5:2:97.5 and electrolysis is performed at a constant temperature of 11° C. with an applied voltage of 40 volts for about two hours. Vertically aligned titanium oxide nanotube arrays are formed on the metal alloy foil. FIG. 2 illustrates a field-emission scanning electron microscopy ("FESEM") image of the top surface of the titanium oxide nanotube array prepared in EXAMPLE 2 and FIG. 3 illustrates an FESEM image of the bottom surface of the titanium oxide nanotube array prepared in EXAMPLE 2. As shown in FIGS. 2 and 3, the average diameter of the vertically aligned titanium oxide nanotubes is less than 100 nanometers. About 10 mg of the titanium oxide nanotube array is then added to a cigarette filter (step 110).

Example 3

Figure 4:
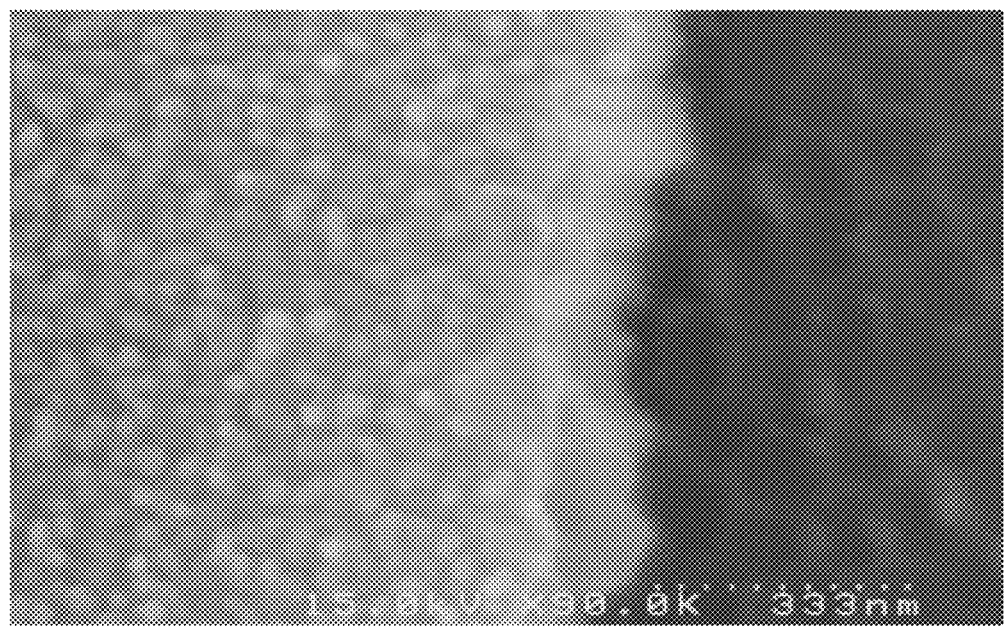
FIG. 4 illustrates an FESEM image of the top surface of an example silver-deposited carbon and titanium oxide nanotube array.

Initially, a metal alloy foil made up of 99 wt % titanium, 0.5 wt % vanadium, and 0.5 wt % aluminum is received (step 102). The metal alloy foil is etched in a solution of nitric acid and hydrofluoric acid mixed at a 3:1 ratio for under one minute to remove any metal oxides. The metal alloy foil is used as an anode and a copper foil is used as a cathode in a two-electrode configuration (step 104). The electrolyte solution is ethylene glycol, distilled water, and ammonium fluoride mixed at a ratio of 0.5:2:97.5 and electrolysis is performed at a constant temperature of 11° C. with an applied voltage of 40 volts for about two hours. Vertically aligned titanium oxide nanotube arrays are formed on the metal alloy foil. The vertically aligned titanium oxide arrays are placed in a crucible including about three grams of ethylene glycol as a liquid carbon source. The crucible is then placed in a heated environment of about 750° C. under an inert nitrogen atmosphere for about one hour to form carbon nanotubes inside of the vertically aligned titanium oxide nanotubes (step 106). Next, about 10 mg of the carbon and titanium oxide nanotube array is immersed in a 0.1 M solution of silver nitrate for about one hour to deposit silver particles on the surface of the carbon nanotubes (step 108). The excess silver nitrate solution can be washed by treating the carbon and titanium oxide nanotube array with distilled water, resulting in the silver-deposited carbon and titanium oxide nanotube array illustrated in FIG. 4. Finally, about 10 mg of the silver-deposited carbon and titanium oxide nanotube array is added to a cigarette filter (step 110).

The cigarette filters of EXAMPLES 1, 2, and 3 were tested for adsorption of nitric oxide and sulfur oxide. Their adsorption was compared with the same type of cigarette without a modified filter as a control. The amount of nitric oxide and sulfur oxide in the tobacco smoke of the four samples is shown in TABLE 1.

TABLE 1

| Sample | Nitric Oxide (ppm) | Sulphur Oxide (ppm) |
| --- | --- | --- |
| Without Adsorbent (Control) | 100 | 300 |
| EXAMPLE 1 | 30 | 40 |
| EXAMPLE 2 | 0 | 20 |
| EXAMPLE 3 | 0 | 0 |

As shown in TABLE 1, adding any one of the highly-ordered nanostructure arrays of EXAMPLES 1, 2, and 3 significantly reduces the nitric oxide and sulfur oxide within tobacco smoke. The titanium oxide nanotube array of EXAMPLE 2, which is based on a titanium alloy foil, adsorbed substantially all of the nitric oxide in the tobacco smoke and significantly adsorbed more sulfur oxide than the titanium oxide nanotube array of EXAMPLE 1 that is based on a pure titanium foil. Moreover, the silver-deposited carbon and titanium oxide nanotube array of EXAMPLE 3 exhibited the best adsorption and significantly adsorbed all of the nitric oxide and sulfur oxide in the tobacco smoke.

Although the adsorption of nitric oxide and sulfur oxide is shown in TABLE 1, the adsorbents can be designed to adsorb a wide variety of pollutants not limited to ammonia, hydrofluoric acid, hydrochloric acid, carbon monoxide, dioxins, pyrene, tar, acroleins, aldehydes, ketones, nitrosamines, nicotine, acetone, hydrogen cyanide, hydroquinone, resorcinol, catechol, and phenol.

It is to be understood that the disclosed implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one implementation" or "an implementation" means that a particular feature, structure, characteristic, or function described in connection with the implementation is included in at least one implementation herein. The appearances of the phrase "in some implementations" in the specification do not necessarily all refer to the same implementation.

Accordingly, other embodiments and/or implementations are within the scope of this application.

What is claimed is:

1. A method of preparation of highly-ordered nanostructure arrays, comprising:
    receiving a metal foil;
    anodizing the metal foil to form a highly-ordered metal oxide nanostructure array;
    synthesizing carbon nanotubes within the inner walls of the highly-ordered metal oxide nanostructures to form a highly-ordered carbon and metal oxide nanostructure array;
    depositing catalytic metal particles on the surface of the carbon nanotubes to form a highly-ordered metal-deposited carbon and metal oxide nanostructure array; and
    including the highly-ordered metal-deposited carbon and metal oxide nanostructure array in a cigarette filter for adsorbing at least nitric oxide and sulfur oxide.

2. The method of claim 1, wherein the metal foil comprises a single metal.

3. The method of claim 2, wherein the single metal of the metal foil is titanium.

4. The method of claim 1, wherein the metal foil is a metal alloy foil comprising two or more metals.

5. The method of claim 4, wherein the two or more metals of the metal alloy foil comprise titanium, aluminum, and vanadium.

6. The method of claim 1, wherein the highly-ordered metal oxide nanostructure array is a vertically oriented highly-ordered metal oxide nanotube array.

7. The method of claim 1, wherein anodizing the metal foil to form the highly-ordered metal oxide nanostructure array comprises using the metal foil as an anode, using another metal foil that is different from the metal foil as a cathode, and using an electrolyte comprising fluoride ions mixed with an organic solution in an electrochemical cell to form the highly-ordered metal oxide nanostructure array.

8. The method of claim 1, wherein synthesizing the carbon nanotubes within the inner walls of the highly-ordered metal oxide nanostructures to form the highly-ordered carbon and metal oxide nanostructure array comprises synthesizing carbon nanotubes within the inner walls of the highly-ordered metal oxide nanostructures by chemical vapor deposition using a carbon source.

9. The method of claim 8, wherein the carbon source is a gaseous carbon source.

10. The method of claim 8, wherein the carbon source is a liquid carbon source.

11. The method of claim 1, wherein the catalytic metal particles are catalytic inner transition metal particles.

12. The method of claim 1, wherein the catalytic metal particles are catalytic metal oxide particles.

13. A method of preparation of highly-ordered nanostructure arrays, comprising:
    receiving a metal foil;
    anodizing the metal foil to form a highly-ordered metal oxide nanostructure array by using the metal foil as an anode, using another metal foil that is different from the metal foil as a cathode, and using an electrolyte comprising fluoride ions mixed with an organic solution in an electrochemical cell to form the highly-ordered metal oxide nanostructure array;
    synthesizing carbon nanotubes within the inner walls of the highly-ordered metal oxide nanostructures to form a highly-ordered carbon and metal oxide nanostructure array;
    depositing catalytic metal particles on the surface of the carbon nanotubes to form a highly-ordered metal-deposited carbon and metal oxide nanostructure array; and
    including the highly-ordered metal-deposited carbon and metal oxide nanostructure array in a filter for adsorbing pollutants.

14. The method of claim 13, wherein the filter is a cigarette filter and the pollutants are at least nitric oxide and sulfur oxide.

15. The method of claim 13, wherein the metal of the metal foil is titanium.

16. The method of claim 13, wherein the highly-ordered metal oxide nanostructure array is a vertically oriented highly-ordered metal oxide nanotube array.

17. The method of claim 13, wherein synthesizing the carbon nanotubes within the inner walls of the highly-ordered metal oxide nanostructures to form the highly-ordered carbon and metal oxide nanostructure array comprises synthesizing carbon nanotubes within the inner walls of the highly-ordered metal oxide nanostructures by chemical vapor deposition using a carbon source.

18. The method of claim 17, wherein the carbon source is a liquid carbon source.

19. The method of claim 13, wherein the catalytic metal particles are catalytic inner transition metal particles.

20. The method of claim 13, wherein the catalytic metal particles are catalytic metal oxide particles.

* * * * *